Figure 1B:
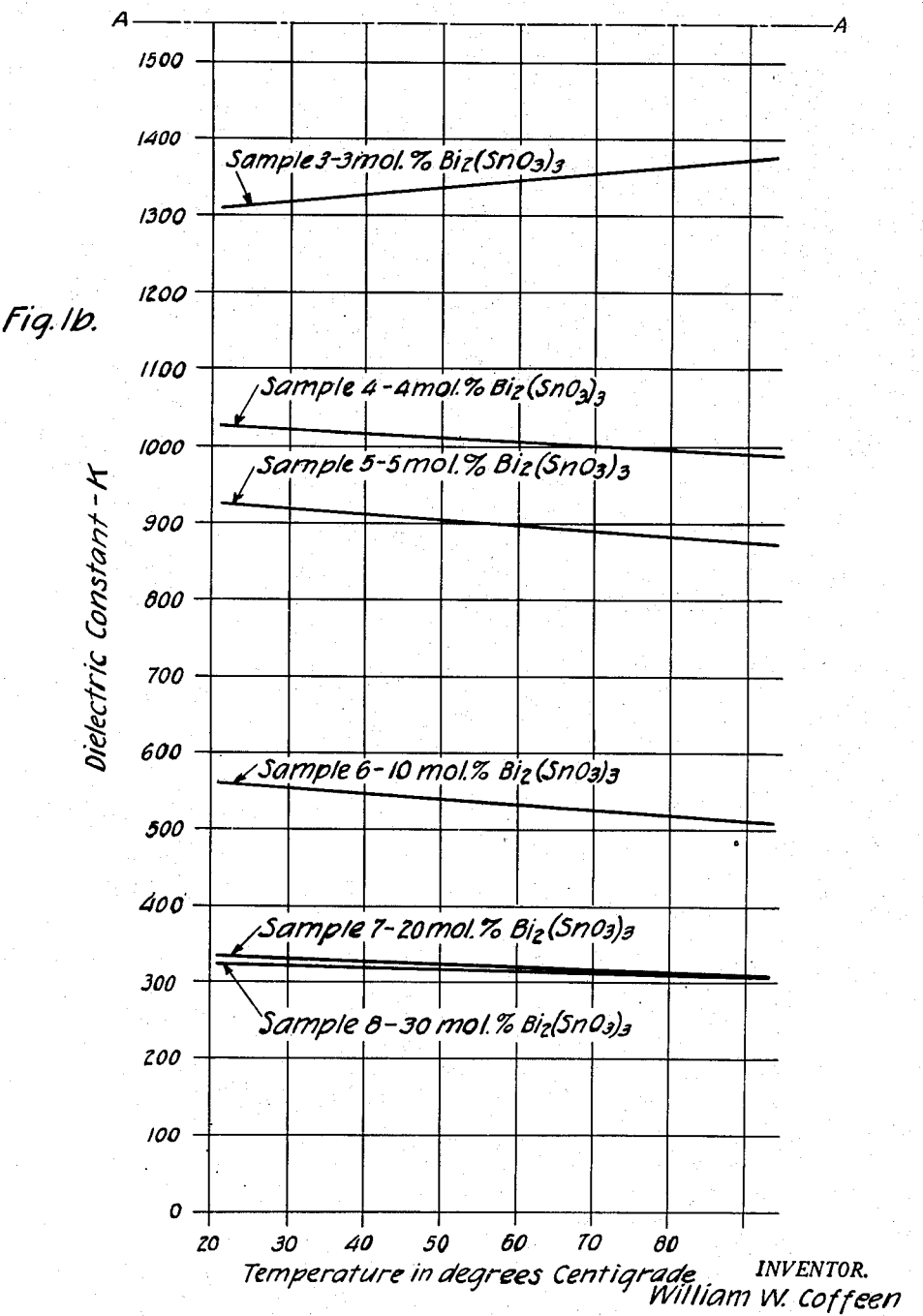

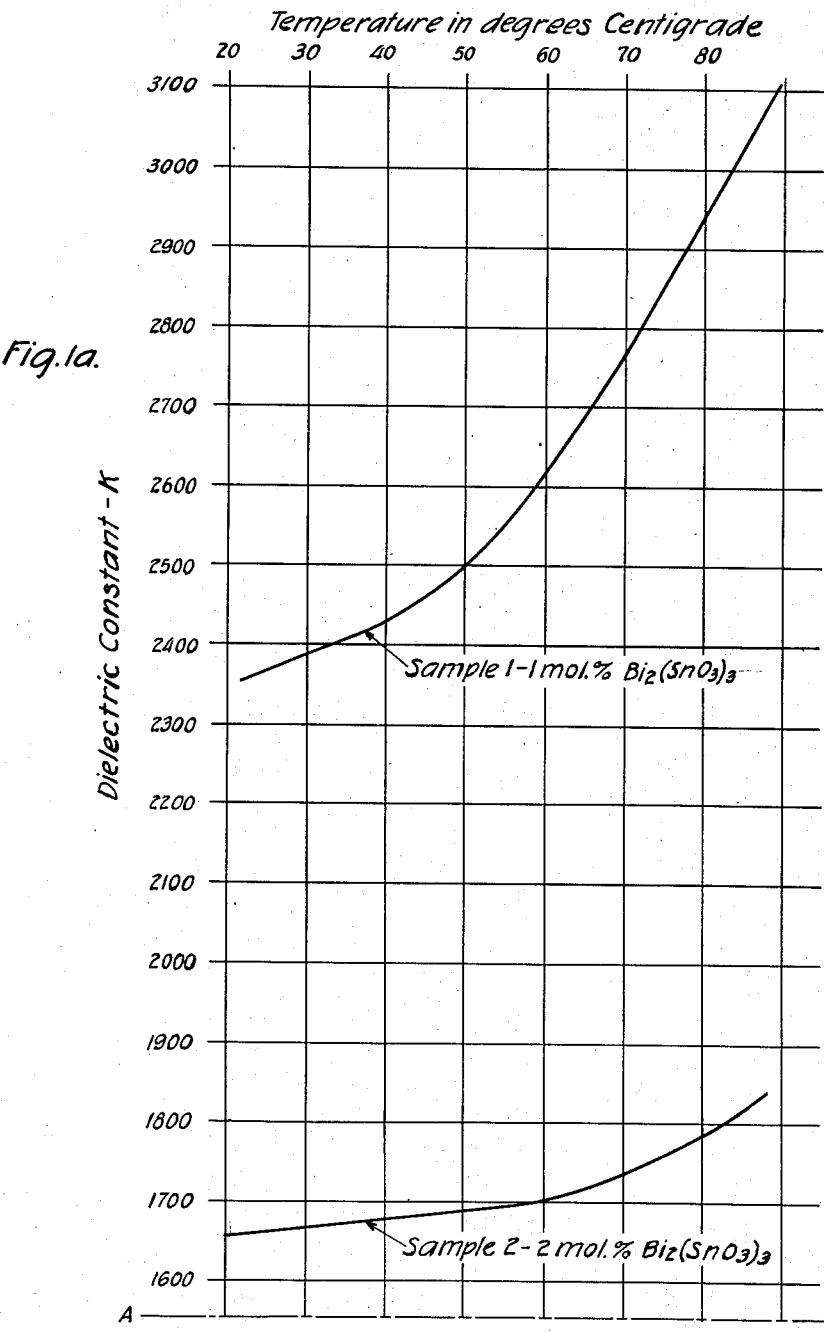

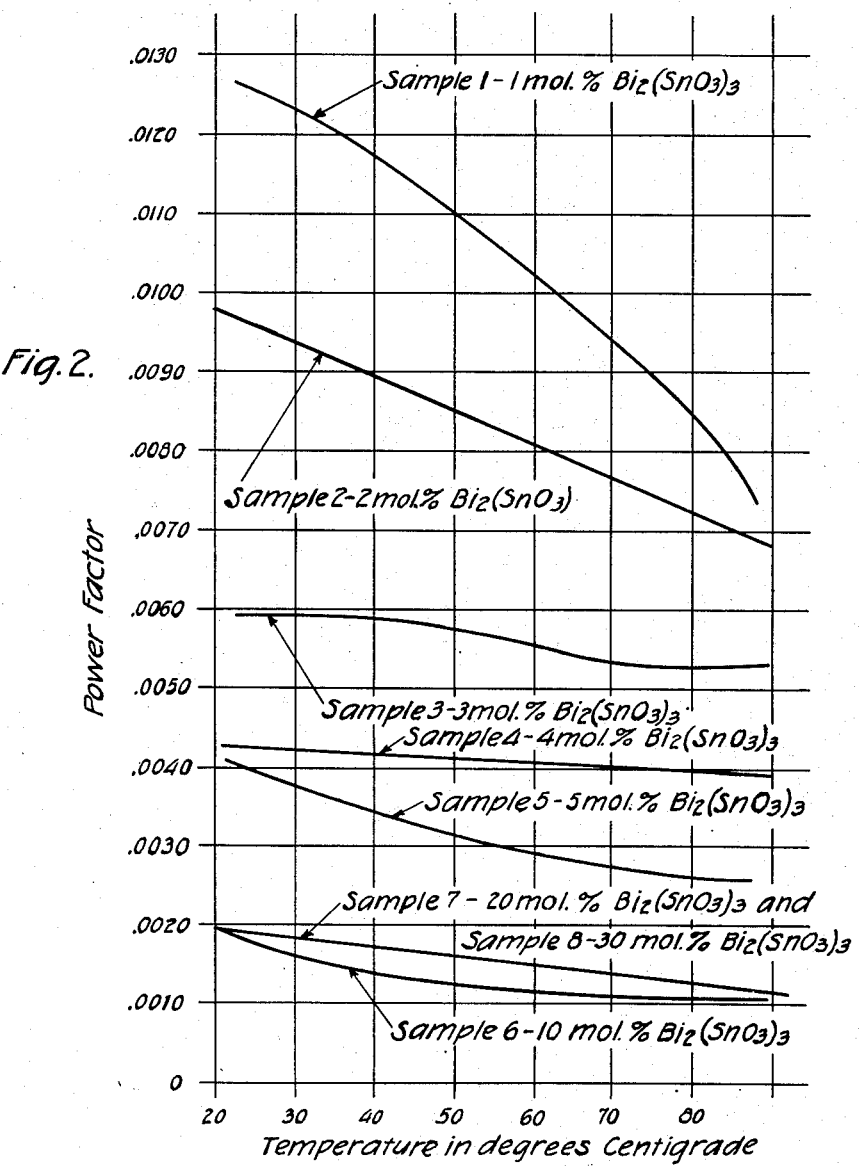

Patented Nov. 10, 1953

2,658,833

UNITED STATES PATENT OFFICE 2,658,833

BISMUTH STANNATE AND COMPOSITIONS EMPLOYING SAME

William W. Coffeen, Union, and Hartmut W. Richter, Rahway, N. J., assignors to Metal & Thermit Corporation, New York, N. Y., a corporation of New Jersey Application June 3, 1952, Serial No. 291,456

6 Claims. (Cl. 106—39)

This invention relates to a new compound, bismuth stannate, and to novel ceramic capacitor dielectrics in which bismuth stannate is combined with barium titanate. The new compound is useful as an ingredient of optical glass for increasing the index of refraction. It is also a useful coloring ingredient of enamels and glazes. At the present time, however, the chief known use of the new compound is its employment as an ingredient in the new capacitor dielectric compositions.

Ceramic bodies having high dielectric constants and low temperature coefficients of dielectric constants are desirable for use in capacitors. The higher the dielectric constant for these materials the smaller the finished capacitor may be. This is advantageous because it enables a desired result to be obtained with a saving of space and materials.

Commercially available ceramic bodies having temperature coefficients of dielectric constants of less than 2000 parts per million per degree centigrade, all have dielectric constants of 200 or less. The novel ceramic capacitors of the present invention are of the class having temperature coefficients below 2000 parts per million, but are unique in that they also have dielectric constants greater than 200 and ranging up to 1000 or more.

It is also important that ceramic capacitor dielectrics have a low power or dissipation factor which varies but little with temperature. In this respect also, the novel ceramic capacitors of the present invention are satisfactory.

Desirable ceramic capacitors may be provided which consist substantially in their entirety of barium titanate ($BaTiO_3$) and bismuth stannate ($Bi_2(SnO_3)_3$). I have found compositions superior to commercially available capacitor ceramics which contain from one-half to thirty molecular percent bismuth stannate with the remainder barium titanate, but the preferred range is from two to ten molecular percent bismuth stannate with the remainder barium titanate.

In the drawing forming part of this specification;

Figures 1a and 1b show graphically the results of tests of certain samples within the invention, each with respect to the dielectric constant and the variation of dielectric constant with temperature; and Figure 2 shows graphically the results of tests of substantially the same samples each with respect to the power factor and the variation of power factor with temperature.

The first phase of the invention has to do with bismuth stannate as a novel compound. The following method is described by way of illustration as one which has been successfully employed in the manufacture of substantially pure bismuth stannate.

In 5 gallons of water, 13 lbs. of technical grade sodium stannate containing 5.8 lbs. tin were dissolved. This solution was clarified of minor water insoluble impurities by setting and decantation. A slurry was prepared by adding 16 lbs. of technical grade bismuth nitrate containing 9 lbs. bismuth to 5 gallons of water. The sodium stannate solution was heated to 80° C. and the bismuth nitrate slurry added slowly with continuous agitation. Small quantities of additional sodium stannate solution were introduced until the clear liquor showed no further precipitation The precipitate of hydrated bismuth stannate was washed at room temperature by several settling and decantation cycles until essentially all water-soluble material was removed. The slurry of washed precipitate was then evaporated to dryness at 110° C. and pulverized. Upon analysis, the product was found to contain 34.10% Sn and 40.04% Bi. The loss on ignition was found to be 9.69%, which can be attributed almost wholly to water.

Bismuth stannate as prepared by the above described method has the following approximate analysis: 44.9% $SnO_2$, 46.2% $Bi_2O_3$ and 8.9% $H_2O$, corresponding to the formula $Bi_2(SnO_3)_3 \cdot 5H_2O$.

An X-ray diffraction powder pattern of the hydrated material reveals only two very broad bands centering about $d=3.079$A° and $d=1.759$A°. In a similar pattern of the bismuth stannate after calcination at 400° F. (at which temperature all water is removed only two very broad bands are again observed, in this case centering about $d=3.029$ and $d=2.667$. This latter pattern is also observed for bismuth stannate calcined at 700° F. After heating to 2100° F., which is the maturing temperature of the bismuth stannate, a pattern is found containing the lines with intensities as noted below.

*X-ray diffraction powder pattern of bismuth stannate after heating to 2100° F.*

| d | I |
|---|---|
| 6.109 | 0.2 |
| 3.694 | 0.1 |
| 3.382 | 0.6 |
| 3.339 | 3.5 |
| 3.204 | 0.2 |
| 3.063 | 10.0 |
| 2.941 | 0.2 |
| 2.659 | 5.5 |
| 2.443 | 0.5 |
| 2.368 | 1.0 |
| 2.311 | 0.1 |
| 2.085 | 0.2 |
| 2.044 | 0.2 |
| 1.880 | 5.5 |
| 1.770 | 0.4 |
| 1.763 | 1.5 |
| 1.704 | 0.1 |
| 1.675 | 0.6 |
| 1.604 | 5.5 |
| 1.537 | 1.3 |
| 1.500 | 0.6 |
| 1.472 | 0.1 |
| 1.439 | 0.2 |
| 1.415 | 0.6 |
| 1.333 | 0.7 |
| 1.223 | 1.3 |
| 1.220 | 0.6 |
| 1.215 | 0.4 |
| 1.212 | 0.3 |
| 1.192 | 1.0 |
| 1.190 | 0.4 |

Apparently bismuth stannate in the hydrated form is an amorphous material which exhibits little crystallinity even upon dehydration but which upon further calcination develops a well-defined crystalline structure. That the compound is real and not simply a mixture of coprecipitated hydrates is proven by the following facts:

1. The very broad band associated with amorphous tin hydrate, centering about $d=2.630$A° is missing from the X-ray powder pattern of hydrated bismuth stannate.

2. The lines of $SnO_2$ are not found in the patterns of the bismuth stannate calcined at either 700° F. or 2100° F. Tin hydrate calcined at these temperatures shows the lines characteristic of $SnO_2$.

3. A thermal analysis (by a differential thermal analysis method) fails to reveal any endothermic melting peak normally associated with the presence of $Bi_2O^3$.

The second phase of the invention has to do with novel compositions employing bismuth stannate. These illustrate an important practical use for the new compound and constitute important inventions in their own right. The following method is described by way of illustration as one which has been successfully used in making a useful sample composition, and as applicable with specific variations as to proportions of ingredients to the making of novel compositions throughout the practical and preferred ranges given herein.

Capacitors of a composition containing four molecular percent bismuth stannate and ninety-six molecular percent barium titanate were prepared as follows:

To 16.92 gms. barium titanate ($BaTiO_3$) were added 3.08 gms. hydrated bismuth stannate $Bi_2(SnO_3)_3$ containing 9.6% $H_2O$. These ingredients were mixed by wet blunging in a beaker with about 100 cc. of distilled water. The mixture was dried and the resulting cake was pulverized in a mortar to pass a 50 mesh screen, and pressed into a slug for calcining. The slug was calcined for one hour at 1700° F. The calcined slug was ground in a mullite mortar to pass a 325 mesh screen. The dry powder was moistened with about 5% by weight of a 2.5% starch solution and pressed into discs of about three-eighths inch diameter and one-tenth inch thickness at a pressure of twenty thousand pounds per square inch. The discs were air dried and then fired on platinum foil for one hour at 2300° F.

The absorption of these specimens was measured by boiling them in carbon tetrachloride for five hours and determining the gain in weight. Each specimen showed less than 0.1% absorption.

Hanovia No. 28 silver paint was applied by brushing to the two sides of the discs and the discs were then fired at 1350° F. Two copper leads were attached by soldering and the dielectric constants and power factors of the capacitors were measured at 1 kc. over the temperature range from 25° C. to 85° C. with the specimens immersed in an insulating oil. The measurements were made on a conventional bridge circuit, using a General Radio 716C bridge with a 1231-B null detector and amplifier for balance. Capacitors of the stated composition (4 molecular percent bismuth stannate, 96 molecular percent barium titanate) were found to have a dielectric constant of 1025 at 25° C. and a power or dissipation factor of .0042. The temperature coefficient of the dielectric constant was —500 parts per million per degree C. over the range from 25° C. to 85° C.

Other samples, made in a similar manner but with the proportions of the ingredients varied as indicated, were similarly tested with respect to dielectric constants, and variation of dielectric constants with temperature, the results of the several tests being graphically shown in Figures 1a and 1b. The same samples were tested for power factor and variation of power factor with respect to temperature, the results being graphically shown in Figure 2. Since the graphs of these figures are self-explanatory, there is no need to describe what they show in detail.

We have described what we believe to be the best embodiments of our invention. We do not wish, however, to be confined to the embodiments shown, but what we desire to cover by Letters Patent is set forth in the appended claims.

We claim:

1. Bismuth stannate.

2. Hydrated bismuth stannate.

3. A novel compound having the formula $Bi_2(SnO_3)_3$.

4. A novel compound having the formula $Bi_2(SnO_3)_3 \cdot 5H_2O$.

5. A range of novel ceramic dielectrics composed substantially of barium titanate and bismuth stannate, the molecular ratio of bismuth stannate to barium titanate being confined within the limits of ½ to 99½ on the one hand and 30 to 70 on the other.

6. A range of novel ceramic dielectrics composed substantially of barium titanate and bismuth stannate, the molecular ratio of bismuth stannate to barium titanate being confined within the limits of 2 to 98 on the one hand and 10 to 90 on the other.

WILLIAM W. COFFEEN.
HARTMUT W. RICHTER.

References Cited in the file of this patent

UNITED STATES PATENTS

| Number | Name | Date |
|---|---|---|
| 2,402,518 | Wainer | June 18, 1946 |
| 2,452,532 | Wainer | Oct. 26, 1948 |

FOREIGN PATENTS

| Number | Country | Date |
|---|---|---|
| 650,099 | Great Britain | Feb. 14, 1951 |
| 347,860 | Italy | Apr. 24, 1937 |